US008738460B2

(12) United States Patent
Pottier et al.

(10) Patent No.: US 8,738,460 B2
(45) Date of Patent: May 27, 2014

(54) AUTOMATICALLY PURCHASING A GIFT FROM A WISH LIST

(75) Inventors: Nicolas Pottier, Seattle, WA (US); Ryan Snodgrass, Kirkland, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 13/620,325

(22) Filed: Sep. 14, 2012

(65) Prior Publication Data

US 2013/0036025 A1 Feb. 7, 2013

Related U.S. Application Data

(63) Continuation of application No. 12/212,563, filed on Sep. 17, 2008, now Pat. No. 8,280,781, which is a continuation of application No. 09/852,124, filed on May 8, 2001, now abandoned.

(60) Provisional application No. 60/275,543, filed on Mar. 12, 2001.

(51) Int. Cl.
*G06Q 30/00* (2012.01)
*G06Q 30/06* (2012.01)

(52) U.S. Cl.
CPC .................................. *G06Q 30/0601* (2013.01)
USPC .......................................... 705/26.1; 705/319

(58) Field of Classification Search
USPC ................ 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2, 319
See application file for complete search history.

(56) References Cited

U.S. PATENT DOCUMENTS

| | | |
|---|---|---|
| 5,663,547 A | 9/1997 | Ziarno |
| 5,721,832 A | 2/1998 | Westrope et al. |
| 5,754,981 A | 5/1998 | Veeneman et al. |
| 5,909,023 A | 6/1999 | Ono et al. |
| 5,960,411 A | 9/1999 | Hartman et al. |
| 6,026,376 A | 2/2000 | Kenney |
| 6,128,599 A | 10/2000 | Walker et al. |
| 6,249,773 B1 | 6/2001 | Allard et al. |
| 6,321,211 B1 | 11/2001 | Dodd |
| 6,370,514 B1 | 4/2002 | Messner |
| 6,405,178 B1 | 6/2002 | Manchala et al. |

(Continued)

FOREIGN PATENT DOCUMENTS

| | | |
|---|---|---|
| WO | WO 9923591 A1 | 5/1999 |
| WO | WO 0016227 A1 | 3/2000 |

(Continued)

OTHER PUBLICATIONS

"Fred Pryor Seminars," dated Mar. 6, 2005, located at http://web.archive.org/web/20050306234345/http://www.pryor.com/faq.asp, accessed from Internet Archive on Jan. 19, 2012.

(Continued)

*Primary Examiner* — Naeem Haq
(74) *Attorney, Agent, or Firm* — Knobbe Martens Olson & Bear LLP

(57) ABSTRACT

A facility for providing a gift is described. In one embodiment, the facility receives information identifying a first person that will give a gift and a second person that will receive the gift given by the first person. The facility then automatically chooses a gift to be given to the second person by the first person.

18 Claims, 8 Drawing Sheets

(56) References Cited

U.S. PATENT DOCUMENTS

| | | |
|---|---|---|
| 6,493,724 B1 | 12/2002 | Cusack et al. |
| 6,519,573 B1 | 2/2003 | Shade et al. |
| 6,587,835 B1 | 7/2003 | Treyz et al. |
| 6,598,026 B1 | 7/2003 | Ojha et al. |
| 6,609,106 B1 | 8/2003 | Robertson et al. |
| 6,611,814 B1 | 8/2003 | Lee et al. |
| 6,629,079 B1 | 9/2003 | Spiegel et al. |
| 6,633,849 B1 | 10/2003 | Dodd |
| 6,669,088 B2 | 12/2003 | Veeneman |
| 6,912,505 B2 | 6/2005 | Linden et al. |
| 6,917,922 B1 | 7/2005 | Bezos et al. |
| 6,999,941 B1 | 2/2006 | Agarwal |
| 7,130,820 B2 | 10/2006 | Song |
| 7,188,081 B1 | 3/2007 | Shah |
| 7,222,087 B1 | 5/2007 | Bezos et al. |
| 7,249,050 B1 | 7/2007 | Walker et al. |
| 7,356,490 B1 | 4/2008 | Jacobi et al. |
| 7,702,545 B1 | 4/2010 | Compton et al. |
| 2001/0013054 A1 | 8/2001 | Okawa et al. |
| 2001/0034609 A1 | 10/2001 | Dovolis |
| 2001/0049636 A1 | 12/2001 | Hudda et al. |
| 2001/0051876 A1 | 12/2001 | Seigel et al. |
| 2002/0019763 A1 | 2/2002 | Linden et al. |
| 2002/0026369 A1 | 2/2002 | Miller et al. |
| 2002/0077929 A1 | 6/2002 | Knorr et al. |
| 2002/0103789 A1 | 8/2002 | Turnbull et al. |
| 2002/0128934 A1 | 9/2002 | Shaer |
| 2002/0143664 A1 | 10/2002 | Webb |
| 2002/0169851 A1 | 11/2002 | Weathersby et al. |
| 2002/0194087 A1 | 12/2002 | Spiegel et al. |
| 2002/0198882 A1 | 12/2002 | Linden et al. |
| 2003/0023687 A1 | 1/2003 | Wolfe |
| 2003/0074253 A1 | 4/2003 | Scheuring et al. |
| 2003/0074265 A1 | 4/2003 | Oshima |
| 2003/0078835 A1 | 4/2003 | Pluchinske |
| 2003/0083961 A1 | 5/2003 | Bezos et al. |
| 2003/0105682 A1 | 6/2003 | Dicker et al. |
| 2003/0154135 A1 | 8/2003 | Covington et al. |
| 2003/0204449 A1 | 10/2003 | Kotas et al. |
| 2003/0233283 A1 | 12/2003 | Shah |
| 2004/0015415 A1 | 1/2004 | Cofino et al. |
| 2004/0098315 A1 | 5/2004 | Haynes et al. |
| 2005/0010486 A1 | 1/2005 | Pandhe |
| 2005/0177458 A1 | 8/2005 | Martineau et al. |
| 2005/0283405 A1 | 12/2005 | Mallo et al. |
| 2006/0047649 A1 | 3/2006 | Liang |
| 2006/0173751 A1 | 8/2006 | Schwarze et al. |
| 2007/0073758 A1 | 3/2007 | Perry et al. |
| 2007/0106627 A1 | 5/2007 | Srivastava et al. |
| 2007/0233736 A1 | 10/2007 | Xiong et al. |
| 2007/0299829 A1 | 12/2007 | Boinus et al. |
| 2008/0097880 A1 | 4/2008 | Landberg |
| 2009/0083164 A1 | 3/2009 | Hull et al. |
| 2009/0106396 A1 | 4/2009 | Nakajima |

FOREIGN PATENT DOCUMENTS

| | | |
|---|---|---|
| WO | WO 0031657 A2 | 6/2000 |
| WO | WO 0062223 A1 | 10/2000 |
| WO | WO 0077703 A1 | 12/2000 |

OTHER PUBLICATIONS

Amazon.com: Wish List, www.amazon.com [accessed May 21, 2008], pp. 1.
Boxedup.com Things I Want, Like, Have, www.boxedup.com [accessed 5/21 12008J , pp. 1.
Camera Phones Granting Wishes, According to Textamerica, BusinessWire, Nov. 19, 2003, New York.
FindGift.com Gift Giving Made Easy, www.findgift.com [accessed May 21, 2008], pp. 1.
Get Started With Kaboodle, Kaboodle, Inc., www.kaboodle.com [accessed Oct. 30, 2007], Copyright 2007, pp. 4.
Gift Box Because a Gift is Worth a Thousand Words . . . , www.giftbox.com [accessed May 21, 2008], pp. 1.
Goldman, A., Online Registries Wed Choice, Convenience, The Oregonian, Jul. 11, 1999, pp. L19, Portland, Oregon.
Google Product Search, www.google.com/products [accessed May 21, 2008].
Hintdropper.com the Ultimate Wish List, www.hintdropper.com [accessed May 21, 2008J, pp. 1.
ListIdeas the Gifts You Want, List It, www.listideas.com [accessed May 21, 2008], Copyright 2006, pp. 5.
MSN Shopping, http://shopping.msn.com [accessed May 21, 2008], pp. 1.
MyGifts.com Give the People What They Want, MyGifts.com, Inc., www.mygifts.com [accessed May 21, 2008], Copyright 2001, pp. 1.
MyThings Organize All Your Things in One Place, MyThings Inc., www.mythings.com [accessed May 21, 2008] Copyright 2006-2008, pp. 1.
Scheraga, D., Penney's Net Advantage, Chain Store Age [Retrieved from Dialog File: 15 #02067152], Sep. 2000, vol. 76, Issue 9.
ShopBop.com Wish List, www.shopbop.com [accessed May 21, 2008], Copyright 2008, pp. 1.
Stylehive Connecting Stylish People, www.stylehive.com [accessed May 21, 2008], pp. 1.
TheThingsIWant.com, www.thethingsiwant.com [accessed Oct. 30, 2007], pp. 2.
Things I Don't Need to Be Happy Is More Stuff Really What You Need?, www.thingsidontneedtobehappy.com [accessed May 21, 2008], pp. 1.
ThisNext, www.thisnext.com [accessed May 21, 2008], pp. 1.
What I Want Most, www.whatiwantmost.com [accessed May 21, 2008], pp. 1.
What is the Gift Hat?, www.gifthat.com [accessed May 21, 2008], pp. 1.
What is Wishlist Buddy?, www.wishlistbuddy.com [accessed May 21, 2008], pp. 1.
Wish Central Your Online Personal Wish List, www.wishcentral.com [accessed May 21, 2008], pp. 1.
Wish Roll, Miracoli Lab, www.wishroll.com [accessed May 21, 2008], Copyright 2006, pp. 3.
Wishlist Create a Wish List, WishList.com, www.wishlist.com [accessed May 21, 2008], Copyright 2008.
Wishlisting What Are You Wishing for?, www.wishlisting.com, pp. 2 , submitted Dec. 15, 2009.
WishListr Let the World Know What You Desire, www.wishlistr.com, pp. 1, submitted Dec. 15, 2009.
Wishpot Beta What Are You Wishing for?, Wishpot, Inc., www.wishpot.com [accessed May 21, 2008], Copyright 2005-2008.
WishRadar Target Acquired, www.wishradar.com [accessed May 21, 2008J, pp. 1.
Wists Social Shopping, www.wists.com [accessed May 21, 2008], pp. 1.

from: Karl Kastle to: Jane Jenkins subject: Thanks

―――

Jane,

Thanks for sending me a copy of the book
How to Do It Yourself! What a great gift!
⎬ 811

Karl

*Fig. 8*

AUTOMATICALLY PURCHASING A GIFT FROM A WISH LIST

CROSS-REFERENCE TO RELATED APPLICATION

This application is a continuation of U.S. patent application Ser. No. 12/212,563, filed Sep. 17, 2008, which is a continuation of U.S. patent application Ser. No. 09/852,124, filed May 8, 2001, now abandoned, which claims the benefit of U.S. Provisional Patent Application No. 60/275,543, filed Mar. 12, 2001, which are hereby incorporated by reference in their entireties.

TECHNICAL FIELD

The present invention is directed to the field of electronic marketing, and, more particularly, to the field of gift purchasing.

BACKGROUND

The World Wide Web ("the Web") is a system for publishing information, in which users may use a web browser application to retrieve information, such as web pages, from web servers and display it. Search engines, subject indices, and links between web pages and web sites facilitate the exploration of information published on the Web.

The Web has increasingly become a medium used to shop for products. Indeed, thousands and thousands of different products may be purchased on the Web. A user who plans to purchase a product on the Web can visit the Web site of a Web merchant that sells the product. view information about the product, give an instruction to purchase the product, and provide information needed to complete the purchase, such as payment and shipping information.

Some web merchants enable a user to identify a list of items that they are interested in receiving as gifts, called a "wish list." Other users that desire to give a gift to that user can view the user's wish list, and then purchase an item from the wish list for the user. When using such wish lists, the gift recipient is more likely to receive appropriate gifts that they desire, and a gift giver is more likely to be able to provide such gifts to the recipient. By providing such a wish list functionality, a web merchant can also often sale items otherwise would not have, thereby generating additional sales and profits for the web merchant.

While conventional wish lists can produce significant benefits, they also have a substantial shortcoming: it often requires considerable effort for gift givers to review wish lists, particularly long ones, and select appropriate gifts to give to gift recipients.

In view of this disadvantage of conventional gift registries, a more powerful wish list functionality that assisted gift givers in selecting gifts for gift recipients would have significant utility.

BRIEF DESCRIPTION OF THE DRAWINGS

FIG. 8 is a display diagram showing a typical display used by the facility to convey an automatic thank you message.

DETAILED DESCRIPTION

Various embodiments of the invention provide a software facility for automatically purchasing a gift from a wish list ("the facility"). The facility may be operated by an online merchant, a separate provider of wish list functionality, or a parties of various other types.

After identifying a gift recipient, without reviewing the gift recipient's wish list, a gift giver may specify price information for a gift to be given to the gift recipient. The facility automatically selects an item from the gift recipient's wish list that satisfies the price information specified by the gift giver, and places an order for the selected item. The selected item is thereafter delivered to the gift recipient, and indicated to be from the gift giver. The facility in some embodiments notifies the gift giver of the selected gift. In some embodiments, before the facility orders the selected gift, it solicits and receives approval from the gift giver. In some embodiments, a list of potential gifts other than a wish list specified by the gift recipient may be used by the facility, such as a list of items recommended based upon the gift recipient's past purchases or other past actions. Some embodiments support automatically suggesting to the gift giver the purchase of a gift for a gift recipient, based upon a connection between the gift giver and gift recipient, and/or based upon an upcoming event associated with the gift recipient, such as a birthday.

From the perspective of the gift giver, the facility greatly streamlines the process of giving a gift to a gift recipient. From the perspective of the gift recipient, more gifts listed on the wish list are received, thereby reinforcing the gift recipient's motivation to maintain a wish list and publicize it to potential gift givers. Both of these factors contribute to the level of profitability of the merchant operating or affiliated with the operator of the facility.

In additional embodiments, the facility automatically determines when a gift has been given to a particular gift recipient and generates a thank you message on the gift recipient's behalf. In further embodiments, when a gift giver gives a gift to a gift recipient, the facility automatically adds the gift recipient to a list of favorite people maintained for the gift giver. This addition to the favorite people list may be used in the future by the facility to suggest that the gift giver give another gift to the gift recipient for a later event associated with the gift recipient. These additional features further increase the usefulness of the facility in streamlining the gift-giving process.

Figure 1:
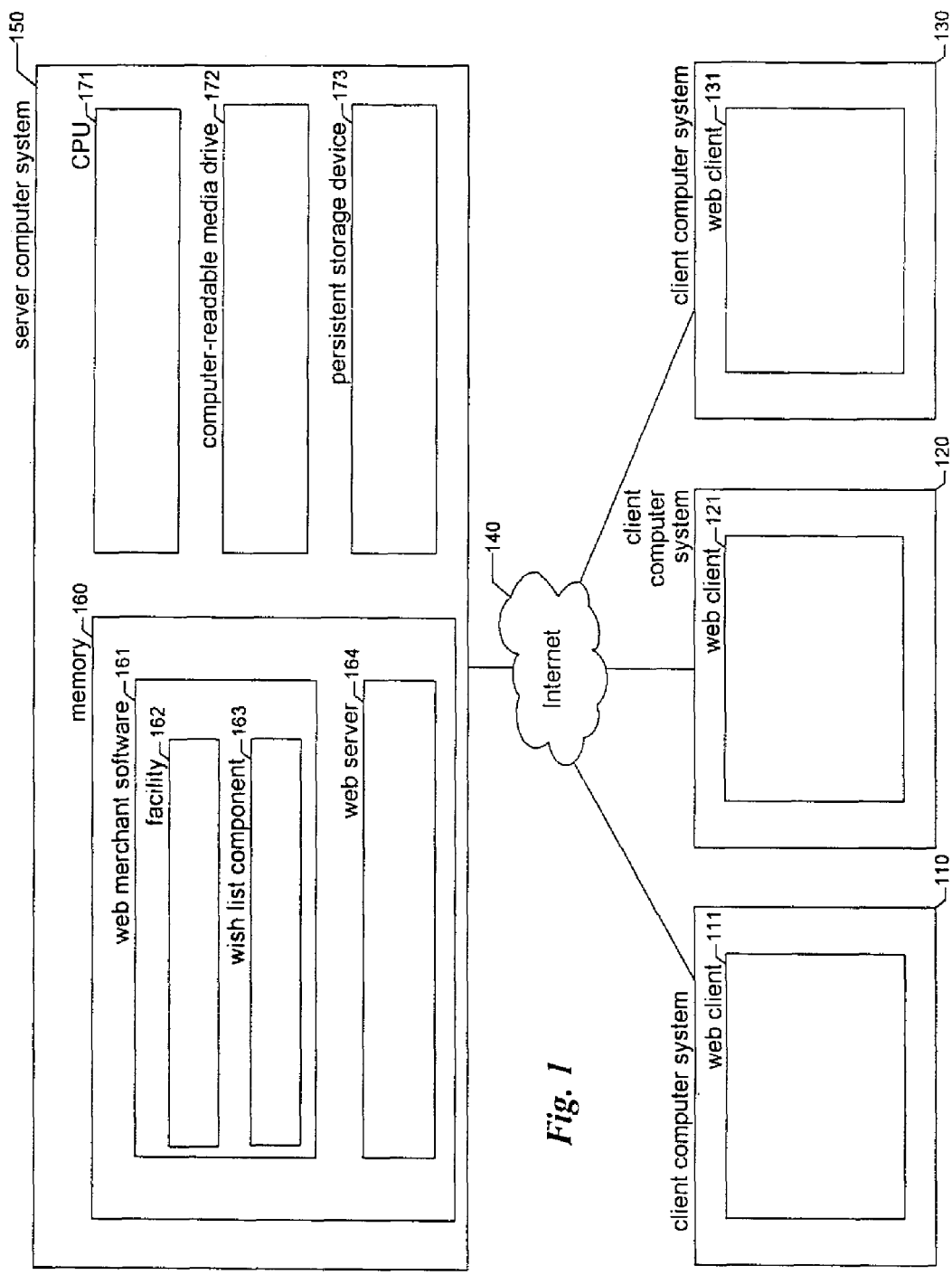
FIG. 1 is a high-level block diagram showing the environment in which the facility preferably operates.

FIG. 1 is a high-level block diagram showing the environment in which the facility preferably operates. The block diagram shows several client computer systems, such as client computer systems 110, 120, and 130. Each of the client computer systems has a web client computer program for browsing the World Wide Web, such as web clients 111, 121, and 131. The client computer systems are connected via the Internet 140 to a server computer system 150 hosting the facility. Those skilled in the art will recognize that client computer systems could be connected to the server computer system by networks other than the Internet, however.

The server computer system 150 contains a memory 160. The memory 160 preferably contains web merchant software 161 incorporating both the facility 162 and a wish list component 163 preferably used by the facility. The wish list component typically receives, for each of a number of users, a wish list of items that the user wishes to receive as gifts from other users. In one embodiment, the wish list component is as described in U.S. patent application Ser. No. 09/528,087, which is hereby incorporated by reference in its entirety.

The memory preferably further contains a web server computer program 164 for delivering web pages in response to requests from web clients. While items 161-164 are preferably stored in memory while being used, those skilled in the art will appreciate that these items, or portions of them, maybe be transferred between memory and a persistent storage device 172 for purposes of memory management and data integrity. The server computer system further contains one or more central processing units (CPU) 171 for executing programs, such as programs 161-164, and a computer-readable medium drive 173 for reading information or installing programs such as the facility from computer-readable media, such as a floppy disk, a CD-ROM, or a DVD.

While preferred embodiments are described in terms in the environment described above, those skilled in the art will appreciate that the facility may be implemented in a variety of other environments including a single, monolithic computer system, as well as various other combinations of computer systems or similar devices connected in various ways.

Figure 2:
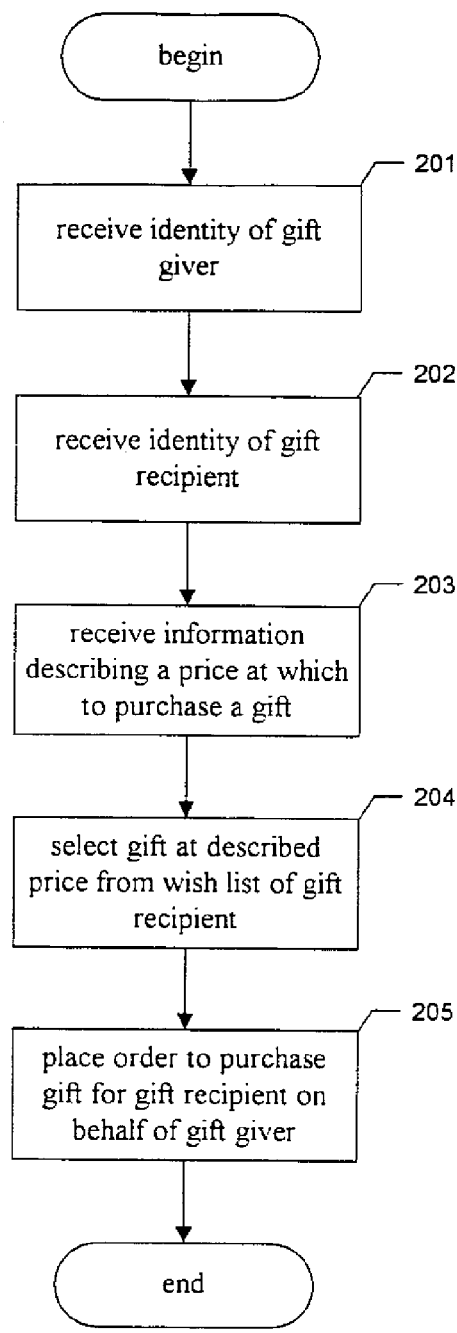
FIG. 2 is a flow diagram showing steps typically performed by the facility in order to arrange a gift from a gift giver to a gift recipient.

FIG. 2 is a flow diagram showing steps typically performed by the facility in order to arrange a gift from a gift giver to a gift recipient. In step 201, the facility receives the identity of the gift giver. In some embodiments, the facility receives this information when the gift giver visits a web site operated by the operator of the facility. The facility may receive such information when the gift giver enters it via the web site, or when the gift giver revisits the web site after having earlier entered it via the web site. In these cases, the revisiting gift giver may be associated with the earlier-entered information by signing in, such as by typing a name and password, or when gift giver's web browser automatically forwards a cookie identifying the gift giver to the web site. The information received in step 201 may be received in various ways other than via such a web site, including receiving an email message or other message from the gift giver containing identifying information.

In step 202 the facility receives the identity of a gift recipient. Information identifying the gift recipient may be received through the web site, such as by the gift giver clicking on a link on the web site identifying the gift recipient, or may be specified in a message sent by the gift giver to the facility, or in some other manner.

In step 203, the facility receives information describing a price at which to purchase a gift for the gift recipient on behalf of the gift giver. For example, this information may be entered by the gift giver using the web site, or may be specified in a message sent by the gift giver to the facility. The information received in step 203 may describe the price at which to purchase a gift in a variety of ways, including a single maximum price, a single minimum price, a single target price, a price range, etc.

In step 204, the facility selects a gift at the described price from a wish list associated with the gift recipient. In one embodiment, the wish list is one that has been generated by the gift recipient. In other embodiments, the wish list is generated in various other ways, such as manually by a person who knows the gift recipient, manually by a person who, though he or she does not know the gift recipient, possesses certain information about the gift recipient, or automatically based upon information known about the gift recipient. In some embodiments, the facility instead selects a gift from among items automatically recommended for the gift recipient by a recommendation engine, such as the one described in U.S. patent application Ser. No. 09/157,198, which is hereby incorporated by reference in its entirety.

The facility may also use various other approaches to selecting a gift. For example, in some embodiments, the facility selects multiple gifts whose prices sum to or near the described price. In some embodiments, the facility bases the selection of a gift on such additional factors as: the comparative margins on items: the availability of inventory in items; the availability of items, including multiple items, from the same distributor or storage facility; a system of item priorities established by the gift recipient; the existence and level of profitability of partnership or associate arrangements for certain items; previous purchases by the gift recipient, and other behavior by the gift recipient reflecting item preference; etc. Where no other item is suitable, a gift certificate may be selected as the gift. Similarly, in a case where one or more items are selected as the gift whose total price is smaller than the described price, the facility may include in the gift a gift certificate for the difference.

In step 205, the facility places an order to purchase the gift selected step 204 for the gift recipient on behalf of the gift giver. In some embodiments, the facility first solicits approval from the gift giver to place the order in step 205. For example, the facility may include in a web page displayed to the gift giver or in a message transmitted to the gift giver information identifying the gift to be given, and a control such as a button for approving this gift. A variety of other approval approaches may also be pursued by the facility, such as identifying a selected gift to the gift giver and ordering the selected gift if the gift giver has not dissented by some deadline.

In some embodiments, after step 205, the facility indicates to the gift giver that the gift has been ordered for the gift recipient, such as displaying a web page containing this information to the gift giver, or transmitting a message containing this information to the gift giver. These steps then conclude.

Figure 3:
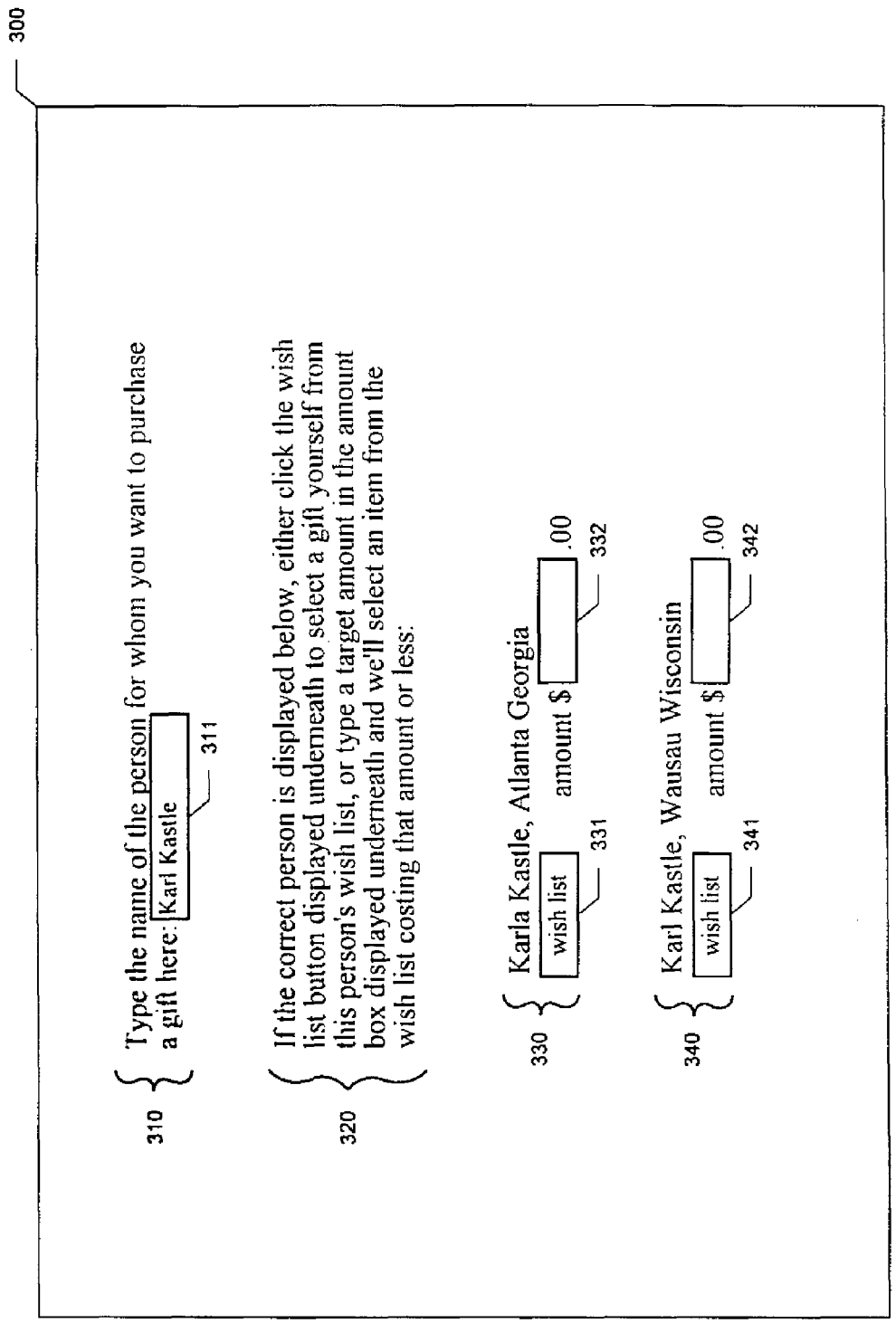
FIG. 3 is a display diagram showing a typical display presented by the facility to a gift giver to arrange a gift from the gift giver to a gift recipient.

FIG. 3 is a display diagram showing a typical display presented by the facility to a gift giver to arrange a gift from the gift giver to a gift recipient. The display 300 may be displayed to the gift giver as a web page, transmitted to the gift giver as a message, or may be a display of another type. Section 310, containing a name field 311, is initially displayed to the gift giver. In response, the gift giver types the name of an intended gift recipient in name field 311. In response, the facility displays sections 320, 330, and 340. Section 320 describes how sections 330 and 340 may be used to select a gift recipient and order a gift. Each of sections 330 and 340 corresponds to a user known to the facility whose name matches the name entered in name field 311. Each of these sections contains information identifying the corresponding user; a wish list button, such as wish list button 331, that the gift giver can click in order to manually select an item from the wish list for this user; and an amount box, such as amount box 332, into which the gift giver may enter a target amount for a gift to be automatically selected by the facility for the user. For example, a gift giver may type the number "25" into amount box 342 to instruct the facility to select a gift from Karl Kastle's wish list whose price is near $25.

Figure 4:
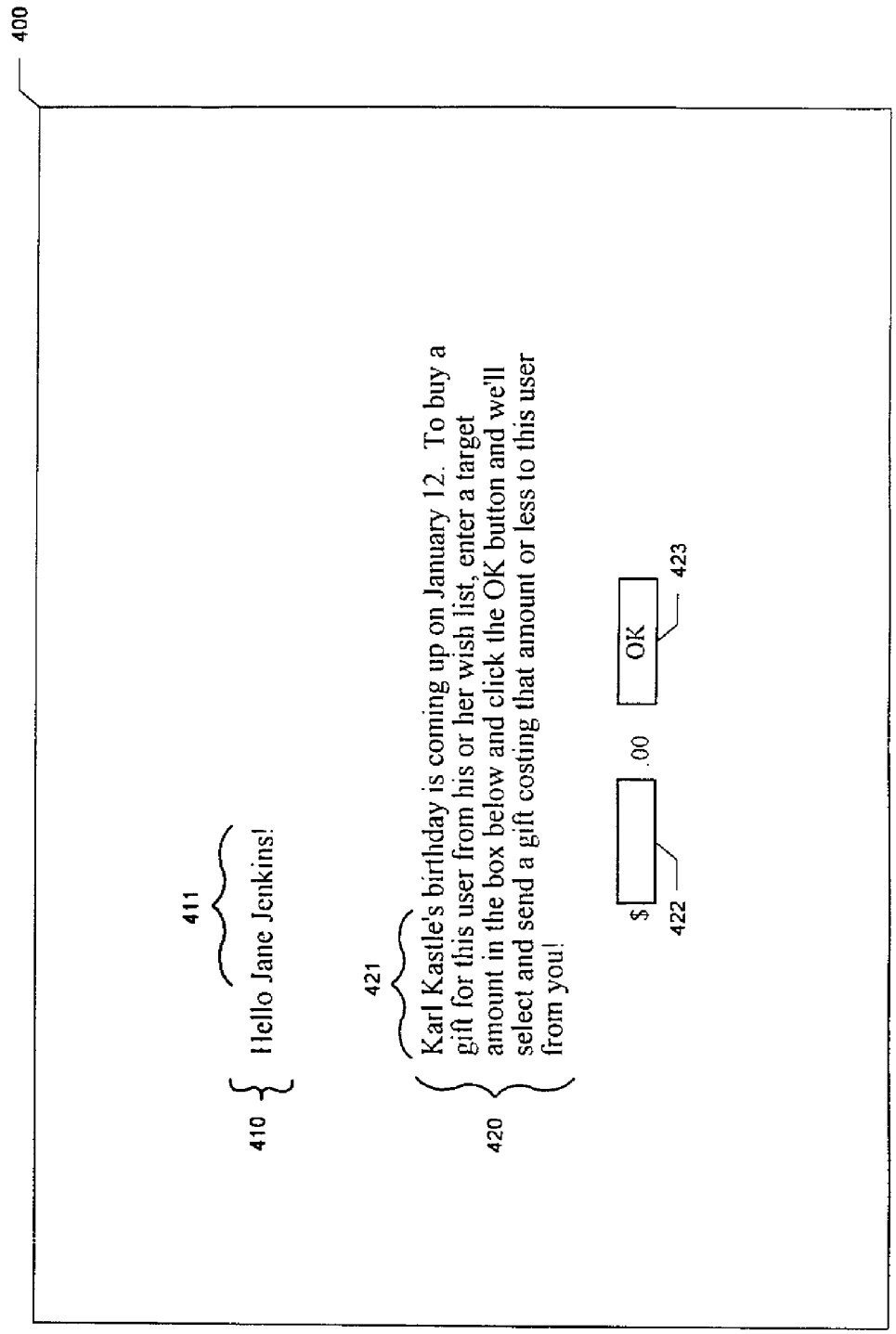
FIG. 4 is a display diagram showing a second typical display used by the facility to arrange a gift from a gift giver to a gift recipient.

FIG. 4 is a display diagram showing a second typical display used by the facility to arrange a gift from a gift giver to a gift recipient. Like display 300, the display 400 may be displayed to the gift giver as a web page, transmitted to the gift giver as a message, or may be a display or another type. The display includes information 410 identifying the gift giver 411. The display further contains a section 420 discussing an upcoming event, in this case a birthday, associated with a potential gift recipient 421. As one example, display 400 may be displayed to the gift giver based upon the purchase of a gift for this event in an earlier year, either using the facility or in another manner. As another example, this display may be displayed to the gift giver based upon the inclusion of the potential gift recipient in a list of the gift giver's favorite people—other users with whom the gift giver has some connection. In order to instruct the facility to automatically select a gift to give to the potential gift recipient for the event on behalf of the gift giver, the gift giver types an amount in amount box 422 and clicks OK button 423. For example, the gift giver may type the number "25" into amount box 422, then click OK button 423 to instruct the facility to select a gift from Karl Kastle's wish list whose price is near $25.

Figure 5:
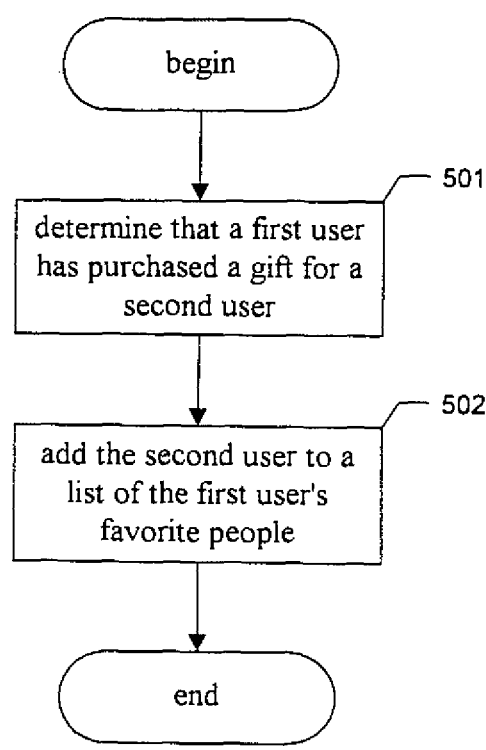
FIG. 5 is a flow diagram showing steps typically performed by the facility in order to automatically add a gift recipient to a list of favorite people associated with a gift giver.

FIG. 5 is a flow diagram showing steps typically performed by the facility in order to automatically add a gift recipient to a list of favorite people associated with a gift giver. In step 501, the facility determines that a first user has purchased a gift for a second user. Such determination may be made where the gift was purchased using the facility, or some other mechanism. Embodiments of the facility may make this determination with respect to gifts purchased from a merchant that is the operator of the facility, a merchant that is affiliated with the operator of the facility, or other merchants.

In step 502, the facility adds the second user to a list of the first user's favorite people, based upon the first user having purchased a gift for the second user. The facility may use this list of favorite people, for example, to determine for which other users to track events and suggest gifts.

Figure 6:
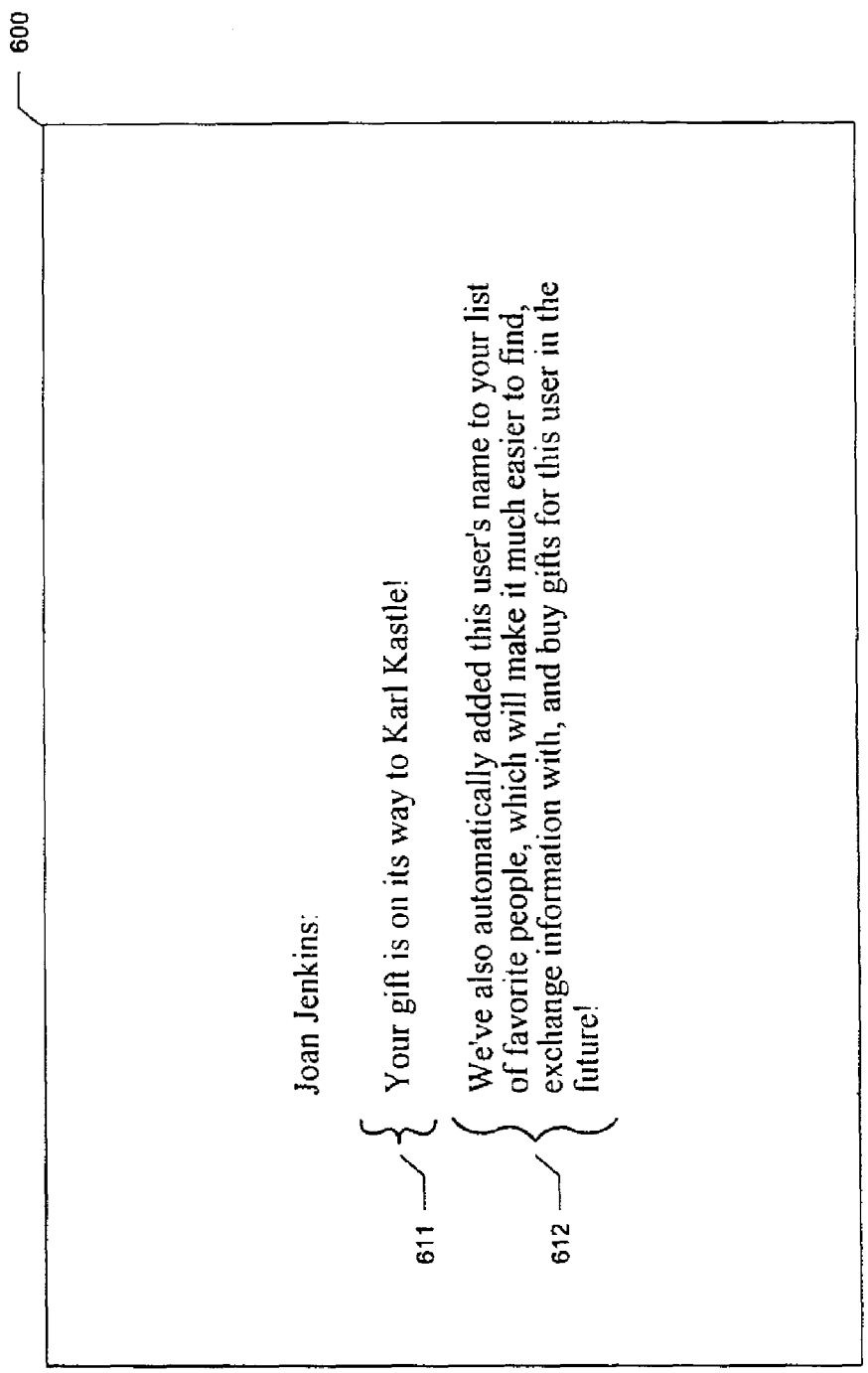
FIG. 6 is a display diagram showing a typical display used by the facility to indicate that it has added a gift recipient's name to the favorite people list for the gift giver.

FIG. 6 is a display diagram showing a typical display used by the facility to indicate that it has added a gift recipient's name to the favorite people list for the gift giver. The display 600 contains a section 611 indicating that the gift has been ordered, and a section 612 indicating that the gift recipient has been added to the favorite people list for the gift giver.

Figure 7:
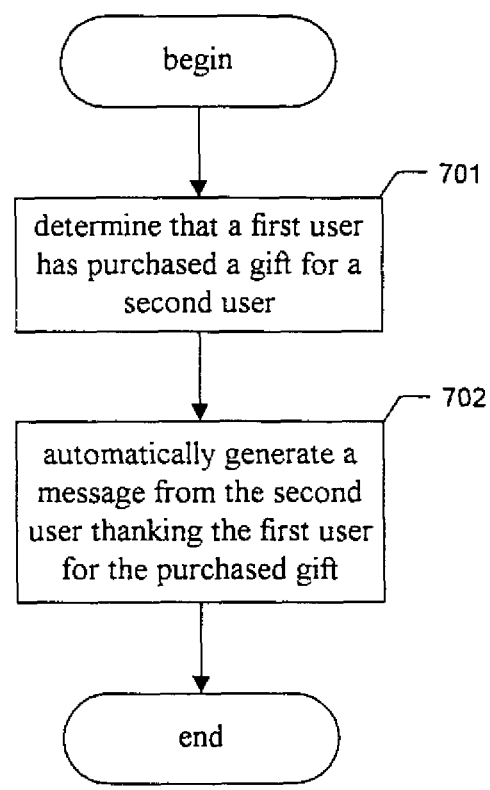
FIG. 7 is a flow diagram showing steps typically performed by the facility in order to generate an automatic thank you message for a gift.

FIG. 7 is a flow diagram showing steps typically performed by the facility in order to generate an automatic thank you message for a gift. In step 702, the facility in determines that a first user has purchased a gift for a second user. This determination may be made in many of the same ways discussed above in conjunction with step 501.

In step 702, the facility automatically generates a message from the second user thanking the first user for the purchased gift. The message generated in step 702 maybe of virtually any type, including email messages, instant messages, pager messages, and voice messages, to name a few. The message is typically designed in a way that makes it appear in most respects like the message was generated manually by the second user. For example, the message may be transmitted to the gift giver directly from the facility, but list the gift recipient as the sender of the message. In another embodiment, the message may be transmitted to the second user to enable the second user to transmit the message to the first user. Alternatively, the second user may supply content for the message, such as by providing an audio and/or a video sequence to be incorporated in the message. After step 702, these steps conclude.

FIG. 8 is a display diagram showing a typical display used by the facility to convey an automatic thank you message. The display 800 indicates that the message is from the gift recipient and addressed to the gift giver, and includes content thanking the gift giver for the gift that includes a specific identification 811 of the gift.

It will be understood by those skilled in the art that the above-described facility could be adapted or extended in various ways. For example, various aspects of the facility may be used without utilizing other aspects of the facility. While the foregoing description makes reference to preferred embodiments, the scope of the invention is defined solely by the claims that follow and the elements recited therein.

What is claimed is:

1. A computer-implemented method for generating automatic correspondence from a first person to a second person, comprising:
under control of one or more configured computing systems,
determining that the first person has given a gift to the second person;
generating a message from the second person to the first person thanking the first person for the gift;
delivering the generated message to the first person, wherein the generated message includes the names of the first person and the second person, and further includes information describing the gift; and
adding the second person to a list of favorite people associated with the first person in response to determining that the first person has given a gift to the second person.

2. The computer-implemented method of claim 1, further comprising:
presenting the generated message to the second person;
requesting authorization from the second person;
receiving authorization from the second person; and
delivering the message only after receiving authorization from the second person.

3. The computer-implemented method of claim 1, wherein the generated message is delivered without further interaction with the second person.

4. The computer-implemented method of claim 1, wherein the generated message is delivered in an electronic mail message.

5. The computer-implemented method of claim 1, wherein the generated message is delivered in an instant message.

6. The computer-implemented method of claim 1, wherein the generated message is delivered via paper mail.

7. The computer-implemented method of claim 1, wherein the generated message is delivered in a web page.

8. A computer-implemented method for maintaining a list of favorite people, comprising:
under control of one or more configured computing systems,
receiving an order for a gift item purchased for a second user on behalf of a first user;
in response to receiving the order, wherein the order is received without input from the first user, processing the order;
determining that the first user has purchased the gift item for the second user; and
adding the second user to a list of favorite people associated with the first user in response to determining that the first user has purchased the gift item for the second user.

9. The computer-implemented method of claim 8, further comprising displaying to the first user information about each of a subset of people including the second user in the list of favorite people associated with the first user, such that information about the second user is displayed.

10. The computer-implemented method of claim 8, further comprising:

determining that an event relating to the second user will occur within a predetermined period of time; and in response to the determination that the event will occur, and to the addition of the second user to the list of favorite people associated with the first user, prompting the first user to give a gift to the second user.

11. The computer-implemented method of claim 8, further comprising:

determining that an event relating to the second user will occur within a predetermined period of time; and in response to the determination that the event will occur, and to the addition of the second user to the list of favorite people associated with the first user, ordering a gift for the second user on behalf of the first user.

12. The computer-implemented method of claim 8, further comprising:

generating a message from the second user to the first user thanking the first user for the gift item purchased; and delivering the generated message to the first user, wherein the generated message includes the names of the first user and the second user, and further includes information describing the gift item purchased.

13. The computer-implemented method of claim 12, further comprising:

presenting the generated message to the second user;

requesting authorization from the second user;

receiving authorization from the second user; and delivering the message only after receiving authorization from the second user.

14. A system for generating automatic correspondence from a first person to a second person, comprising:

a gift determination component including a processor and operative to execute instructions stored in memory to determine that the first person has given a gift to the second person;

a message generation component including a processor and operative to execute instructions stored in memory to generate a message from the second person to the first person thanking the first person for the gift;

a message delivery component including a processor and operative to execute instructions stored in memory to deliver the generated message to the first person, wherein the generated message includes the names of the first person and the second person, and further includes information describing the gift; and a favorite user addition component including a processor and operative to execute instructions stored in memory to add the second person to a list of favorite people associated with the first person in response to determining that the first person has given a gift to the second person.

15. The system of claim 14, wherein the message delivery component is further operative to execute instructions stored in memory to:

present the generated message to the second person;

request authorization from the second person;

receive authorization from the second person.

16. The system of claim 15, wherein the message delivery component is operative to execute instructions stored in memory to deliver the message only after receiving authorization from the second person.

17. The system of claim 14, wherein the message delivery component is operative to execute instructions stored in memory to deliver the message without further interaction with the second person.

18. The system of claim 14, wherein the generated message is delivered in one of: an electronic mail message, an instant message, paper mail, and a web page.

* * * * *

UNITED STATES PATENT AND TRADEMARK OFFICE
CERTIFICATE OF CORRECTION

PATENT NO.        : 8,738,460 B2                      Page 1 of 1
APPLICATION NO.   : 13/620325
DATED             : May 27, 2014
INVENTOR(S)       : Nicolas Pottier et al.

It is certified that error appears in the above-identified patent and that said Letters Patent is hereby corrected as shown below:

In the Specification

In column 1 line 33, Change "product." to --product,--.

In column 3 line 44, Change "a" to --a user--.

In column 3 line 45, Change "when" to --when the--.

In column 4 line 18, Change "items:" to --items;--.

In column 5 line 46, Change "in determines" to --determines--.

In column 5 line 52, Change "maybe" to --may be--.

Signed and Sealed this
Seventh Day of April, 2015

Michelle K. Lee
*Director of the United States Patent and Trademark Office*